Nov. 1, 1966 J. B. HAMMER 3,282,797
THIN FILM LIQUID EVAPORATOR FORMED OF A
THIN CORRUGATED SHEET-LIKE MEMBER
Filed May 25, 1962 2 Sheets-Sheet 1

WITNESSES
Leon M. Garman
Robert C. Baird

INVENTOR
Joel B. Hammer.
BY
Frank Cristiano Jr.

United States Patent Office 3,282,797
Patented Nov. 1, 1966

3,282,797
THIN FILM LIQUID EVAPORATOR FORMED OF A THIN CORRUGATED SHEET-LIKE MEMBER
Joel B. Hammer, Penn Hills, Pa., assignor to Westinghouse Electric Corporation, East Pittsburgh, Pa., a corporation of Pennsylvania
Filed May 25, 1962, Ser. No. 197,660
15 Claims. (Cl. 202—236)

This invention relates to heat exchange apparatus, more particularly to evaporator apparatus, and has for an object to provide an evaporator structure having improved liquid spreading characteristics.

Another object of the invention is to provide evaporator apparatus employing the surface tension of the liquid for horizontally spreading the liquid in a thin film.

A more specific object of the invention is to provide a liquid evaporator plate structure of the above type having a configuration in its upper portion promoting the accumulation and uniform distribution of liquid to the main portion, and in which the main portion has a configuration promoting the horizontal spreading of the liquid to form a thin liquid film.

Although not particularly limited thereto, the invention is highly suited for employment in apparatus for converting impure water into substantially pure or potable water, which apparatus is of the type in which vapor formed by vaporization of impure water on one face of a heat exchange plate structure is partially compressed and directed to the opposite face of the heat exchanger plate, thereby yielding its heat to the plate for vaporization of the impure water and concomitant condensation of the thus cooled vapor.

In apparatus of the above type, the evaporation rate is inversely proportional to the thickness of the water film. Hence, in order to attain a high rate of evaporation, it is desirable to spread the incoming impure water on the plate structure in a thin film in order that optimum heat exchange may be attained between the condensing face and the evaporating face of the plate structure.

With the present invention, exceedingly thin water film forming characteristics are provided in the plate, and the film attained is on the order of less than a few thousandths of an inch, for example, about one thousandth of an inch.

Briefly, in accordance with the invention, there is provided a liquid evaporation plate structure having a surface generally inclined with the horizontal and provided with one or more downwardly extending ridges, each having a downwardly extending recess or groove disposed centrally therein for receiving the liquid to be evaporated. Each ridge has a surface formed in a manner to utilize the surface tension of the liquid to promote spreading of the liquid thereon in a thin film. Preferably, the surface is of convex curvilinear cross-sectional shape with increasing radius of curvature in opposite directions from the groove. Hence, as the liquid flows downwardly by gravity through each groove, the surface tension of the liquid establishes a pressure gradient across the surface of each ridge that drives the liquid in opposite horizontal directions from the groove and around the curvilinear surfaces of the ridge to form a thin film. The thinness of the film is primarily determined by the pressure gradient due to the surface tension of the liquid but may be augmented by the pressure gradient due to the gravitational force on the liquid.

The liquid, such as water, is supplied to the upper portion of the liquid evaporation plate structure by nozzle structure or other spray forming device and, in order to promote the distribution of the water to the grooves in the ridges, the upper portion of the liquid evaporation plate structure may be formed with a series of vertically extending ridges and valleys. The ridges of the upper portion of the plate are of the same pitch as the ridges disposed in the main portion for spreading the water and preferably of substantially the same cross-sectional shape. However, the ridges in the upper portion are displaced laterally from the ridges in the main portion by a distance equal to one half the pitch. Hence, as the spray strikes the upper surface of the plate, the water is driven into the valleys by the pressure gradient due to the surface tension of the water and directed to the grooves of the ridges in the main portion of the plate.

A plurality of such liquid evaporation plates may be provided and connected to each other to form an accordion-shaped or serpentine structure having a series of such plates connected to each other at their adjacent top and bottom areas. The bottom portions of the thus-connected plates are employed to collect the excess water from the liquid evaporation plates and this water may be drained from the system by any suitable conduit structure.

The above and the objects are effected by the invention as will be apparent from the following description and claims taken in connection with the accompanying drawings, forming a part of this application, in which:

Figure 1:
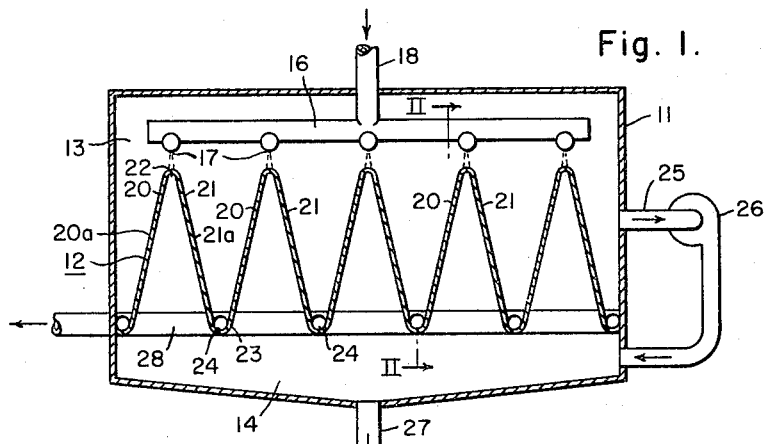
FIGURE 1 is a highly diagrammatic view of liquid conversion apparatus employing the invention.

Referring to the drawings, in detail, in FIG. 1 there is shown apparatus for converting impure water into pure or potable water and comprising an outer shell structure 11 having a heat exchange or evaporator plate structure 12 disposed therein and dividing the shell structure 11 into a liquid evaporation chamber 13 and a liquid condensation chamber 14. A liquid distribution manifold 16, provided with a plurality of spray nozzles 17, is disposed in the evaporation chamber 13 and is provided with heated brine or impure water from any suitable source (not shown) by a supply conduit 18.

The evaporator plate structure 12, as illustrated in FIG. 1, is of relatively thin cross-section and is generally of serpentine form. That is, the evaporator plate structure 12 is provided with a first series of plate members 20 extending downwardly and inclined with the horizontal in one direction and a second series of plate members 21 inclined in the opposite direction and also extending downwardly. The upper portions of each pair of adjoining plates 20 and 21 are connected to form apical portions 22 and, in a similar manner, the lower adjacent portions of the plate members 21 and 20 are connected to each other at 23 to form troughs 24.

The evaporating chamber 13 is connected to the condensing chamber 14 by suitable conduit structure 25 having a vapor compressor or pump 26 interposed therein and the lower portion of the condensing chamber 14 is provided with a suitable outlet conduit 27.

In operation, the heated impure water is sprayed by the spray nozzles 17 onto the apical portions 22 of the plate structure 12, and flows downwardly therefrom along the upper faces of the plate members 20 and 21. During the flow of the liquid over these surfaces, evaporation of the liquid is attained and the vapors thus formed in the evaporation chamber 13 are withdrawn therefrom by the conduit 25 and pumped into the condensing chamber 14 by the pump 26. Accordingly, the evaporating chamber 13 is operated at a lower pressure than the condensing chamber 14. As the thus pressurized vapors flood the condensing chamber 14, they serve to heat the evaporator plate structure 12 to a sufficient degree to continue evaporation of the film of water forming on the evaporating faces of the plate members 20 and 21. As the vapors in the condensing section 14 yield their heat to the evaporator plate structure 12, they are condensed into liquid form as substantially pure water that is drawn from the condensing chamber 14 by the outlet conduit 27 and collected in suitable storage apparatus (not shown) for use. During operation, an excess of liquid is supplied by the nozzles 17 to the evaporator structure 12. Hence, only a portion of the liquid flowing along the evaporating surfaces is vaporized. The unvaporized water flows downwardly and is collected in the troughs 24, where it may be removed from the apparatus by a suitable manifold structure 28.

The formation of hard scale which would reduce the efficiency of the apparatus is minimized, since only a small portion of the impure water supplied is vaporized by the evaporating apparatus described above, and the unevaporated water collecting in the troughs 24, is only moderately enriched in solids.

As thus far described, the apparatus is substantially conventional, and, in operation gravity is the main force relied upon to cause the liquid to flow over the inclined surfaces of the evaporator plate structure 12. With conventional apparatus of the above type, the liquid forms objectional rivulets and, even where a film is formed, the film is considerably thicker than the optimum thin film required for most efficient vaporization thereof.

In accordance with the invention, the plate members 20 and 21 of the evaporator structure 12 are provided with evaporating faces formed in a manner to promote the formation of thin films of water during its flow thereover, to promote the evaporation of the liquid thereon and to permit operation of the apparatus at relatively low temperatures, that is normal ambient or slightly higher temperature values on the order of about 100° F. Since the plate members 20 and 21 are substantially identical, only the plate member 20 will be described.

Figure 4:
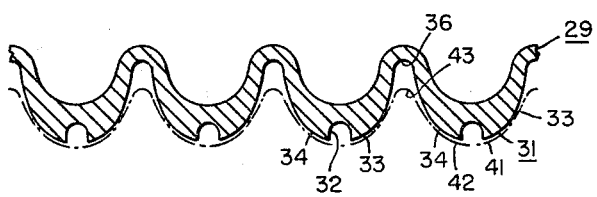
FIG. 4 is a view similar to FIG. 3 but taken on line IV—IV of FIG. 2.
Figure 5:
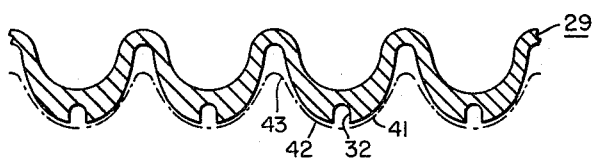
FIG. 5 is a view similar to FIG. 4 and taken on line V—V of FIG. 2.

The plate member 20 has a main portion 29 and an upper portion 30. The main portion is formed with a plurality of downwardly extending ridges 31 of substantially identical shape. Each of the ridges has a centrally disposed downwardly extending groove 32 and a pair of surfaces 33 and 34 axially coextensive with and extending transversely in opposite directions from the groove 32. The faces 33 and 34 of each ridge 31 are of convex shape, and preferably of curvilinear cross-sectional shape of increasing radius of curvature in opposite directions from the associated groove 32, as best shown in FIGS. 4, 5 and 7. However, the rate at which the radius of curvature increases is not critical and may be selected as desired. The ridges 31 are disposed in side-by-side relation with each other and, in the embodiment shown in FIGS. 4, 5, 6 and 7, the adjacent convex faces 34 and 33 of neighboring ridges 31 are connected to each other by concave curvilinear portions 36 or valleys of slightly smaller transverse extent than the grooves 32.

Referring to FIGS. 4 and 5, it will be seen that the convex faces 34 and 33 of the ridges 31 are of substantially the same cross-sectional shape and size throughout their vertical extent. However, the grooves 32 are of diminishing cross-sectional area in downward direction.

The grooves 32 may be referred to as water receiving or distributing grooves, while the concave surface portions 36 may be referred to as excess water collecting grooves.

Figure 2:
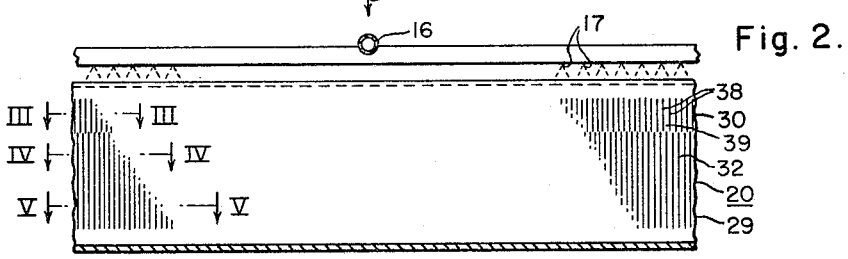
FIG. 2 is a sectional view taken on line II—II of FIG. 1 and showing the surface configuration of one of the liquid evaporation plates, in accordance with the invention.
Figure 3:
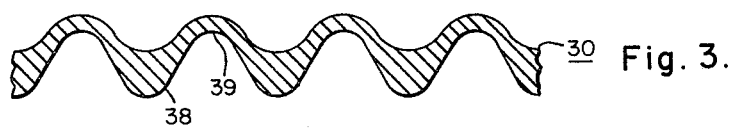
FIG. 3 is a sectional view on a greatly enlarged scale taken on line III—III of FIG. 2.
Figure 6:
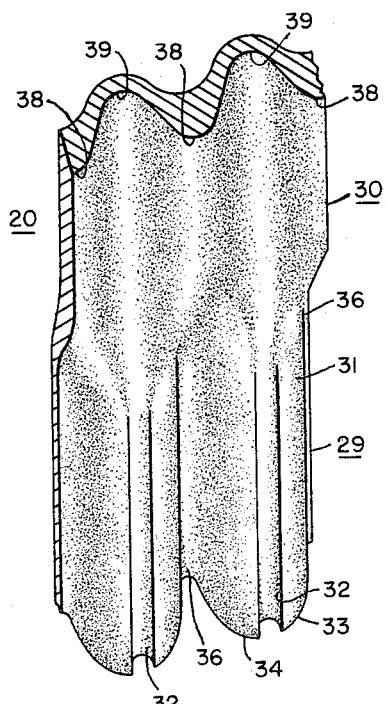
FIG. 6 is a fragmentary perspective view taken on the same scale as FIGS. 3 to 5, showing the surface contour of a portion of the plate shown in FIG. 2.
Figure 7:
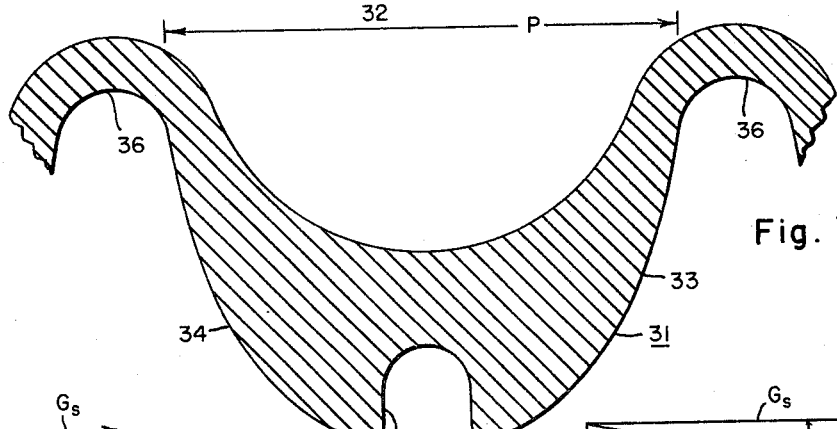
FIG. 7 is a view similar to FIG. 4 but showing only one of the ridges and associated surfaces on a further greatly enlarged scale.

The upper portion 30 of plate 20, as best illustrated in FIGS. 3 and 6, is provided with a plurality of convex curvilinear ridges 38 and concave curvilinear valleys 39 disposed in an alternating arrangement to form a convoluted or corrugated surface. The width or pitch of the ridges 38 in the upper portion of the plate is of substantially the same extent as the pitch of the ridges 31 in the main portion of the plate. However, the ridges 38 are offset laterally a distance equal to one half the pitch of the ridges 31, so that the ridges 38 are disposed in axial alignment with the excess water collecting grooves 36, while the valleys 39 are disposed in axial alignment with the water receiving grooves 32. This feature is also diagrammatically illustrated in FIG. 2. The lower portions of the valleys 39 and the ridges 38 are complementary to each other and the valleys are preferably convergent in downward direction while the ridges are preferably divergent in downward direction to smoothly merge with the ridges 31 and grooves 36.

The apical portions 22 of the plates 20 and 21 may be substantially smooth, and in a similar manner, the lower portions of the plates forming the troughs 24 may be substantially smooth.

During operation, water is sprayed by the nozzles 17 onto the apical portions 22 in excess of that required for evaporation, and as it flows downwardly therefrom onto the upper portions 30 of the plates 20 and 21, it is collected or divided into small rivulets flowing downwardly along the valleys 39 and draining from the ridges 38 to form a thin film. Hence, as the water thus collected by the valleys 39 proceeds downwardly by gravitational effect, it is directed into the grooves 32 of the ridges 31. As the grooves 32 become substantially filled with flowing water, a portion of the water is drawn laterally therefrom onto the convex surfaces 33 and 34 and spread thereon in a thin film. During flow over the convex surfaces 33 and 34, the water film is formed and maintained by a pressure gradient due to the surface tension of the water. Also, since the plates extend vertically, there is a pressure gradient due to the gravitational effect, so that the film spreads generally in a horizontal direction but with a slightly downward component. Due to the specific shape of the ridges 31, the water delivered by the grooves 32 to the ridges 31 in excess of that evaporated is directed into the excess water collecting grooves 36 and drains downwardly therefrom into the troughs 24. Hence, on the major portion of the ridges 31 a thin water film is maintained that is highly evaporable as rapidly as it forms. The water film forming on the ridges 31 is illustrated in FIGS. 4 and 5 by the dot-and-dash lines 41 and 42, while the excess water collecting in the grooves 36 is illustrated by the dot-and-dash line portion 43. It will be noted, however, that the thickness of the film has been highly exaggerated, for clarity. As the water flows downwardly along the grooves 32, it is continuously diverted therefrom to form the thin film. Hence, in the lower portion of the ridges 31, less liquid is maintained in the grooves 32 and, to promote the formation of the thin film in the lower portions of the ridges 31, the cross-sectional area of the grooves 32 is formed of continuously diminishing size in downward direction (compare FIGS. 4 and 5).

For ease of illustration and comprehension, the ridges 31 and grooves 32, as well as the valleys 38 and 39, have been shown in large scale in FIGS. 3 to 7 inclusive. However, in actual practice, the ridges are formed to a much smaller size.

Referring to FIG. 7, it will be noted that the convex curvilinear surface of the ridge 31 has a width or pitch indicated by the letter P. It has been found that with the illustrated convex surface contour of surfaces 33 and 34, the pressure gradient to effect the spreading of the water from the grooves 32 may be modified, as desired to suit substantially any application, by varying the pitch P, since the pressure gradient due to surface tension of the liquid is inversely proportional to the square of the pitch of the ridges, while the pressure gradient due to gravity is a constant. The pitch of the ridges 31 may vary, for example, from a very small value of about .031 inch to a considerably larger value of about .210 inch and, between these two values, there are innumerable other values that may be advantageously employed. The following list or table shows pressure gradient values for a pitch of .210 inch, .094 inch, .066 inch and .031 inch:

| P | $G_s$ | $G_g$ | $G_t$ | $\theta$ |
|---|---|---|---|---|
| .210 | 1,000 | 980 | 1,400 | 44°25′ |
| .094 | 5,000 | 980 | 5,080 | 11°5′ |
| .066 | 10,000 | 980 | 10,500 | 5°36′ |
| .031 | 50,000 | 980 | 50,010 | 1°7′ |

In the above table:

P—pitch of the ridges in inches
$G_s$—pressure gradient in dynes/cm.$^2$/cm. due to surface tension of the water
$G_g$—pressure gradient in dynes/cm.$^2$/cm. due to gravity
$G_t$—total pressure gradient in dynes/cm.$^2$/cm.
$\theta$—angle of inclination of $G_t$ FIGS. 8A, 8B and 8C are vectorial analyses for pitches of .210 inch, .094 inch and .066 inch, respectively employing the data shown in the above table.

Figure 8A:
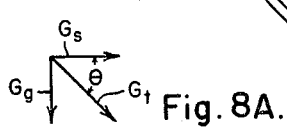
FIGS. 8A, 8B and 8C are vector diagrams showing the variation in the spreading effect of the liquid by varying the proportions of the structure shown in FIG. 7.
Figure 8B:
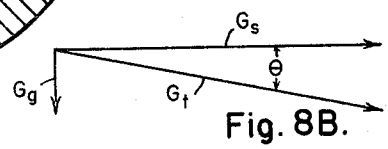
Figure 8C:
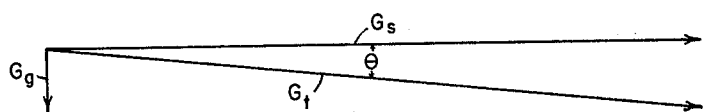

The vectorial analysis for a pitch of .031 inch has not been shown, since $G_s$ is 50 times $G_g$ and would result in vectors $G_s$ and $G_t$ of exceedingly large length in horizontal direction which would require a smaller scale than that employed with FIGS. 8A to 8C, inclusive, in order to be shown on the drawings. However, it will be seen from the table that when a pitch of .031 inch is employed, the effect of $G_g$ on $G_t$ is relatively insignificant.

Figure 9:
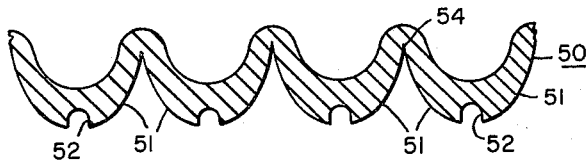
FIG. 9 is a cross-sectional view similar to that shown in FIG. 4 but showing another embodiment of the invention.

IN FIG. 9 there is shown another embodiment of an evaporator plate 50. This arrangement is similar to that of plate 20 described above and is provided with a plurality of ridges 51 of convex curvilinear cross-sectional shape extending downwardly and having a central groove 52 for distributing liquid to the convex surfaces 51 in the same manner described above. Here again, the surfaces 51 are of increasing radius of curvature in opposite directions from the groove 52. However, in this embodiment, the convex surfaces 51 of the neighboring ridges are extended so that the junctions therebetween are substantially knife-edged as indicated at 54, thereby eliminating the excess water collecting grooves 36, previously described in connection with the first embodiment. This arrangment many be advantageously employed when it is desired to operate the evaporator plate 50 with substantially no excess liquid. Under such circumstances, the rate of flow of liquid to the grooves 52 is controlled in such a manner that the flow over the surfaces of the ridges 51 is only sufficient to form and sustain a thin film during operation. In all other respects, this arrangement may be substantially the same as that described above.

It will now be seen that the invention provides a highly improved evaporator or heat exchanger structure having a surface configuration that promotes the formation of an exceedingly thin film of liquid for high evaporation rates. The thickness of the liquid film attained with the invention is on the order of less than a few thousandths of an inch and usually is about one thousandth of an inch.

Since the heat exchange rate between a heated surface and liquid disposed thereon is inversely proportionate to the thickness of the film, it will now be seen that the heat exchanger surface disclosed herein will provide rapid evaporation with substantially low differential in temperature across the heat exchanger plate. That is, the heat of the vapor in the condensing chamber 14 is effective to vaporize the film in the vaporizing section 13 of the apparatus shown in FIG. 1, even though the vapor in the condensing chamber 14 is only a few degrees hotter than the atmosphere in the vaporizing chamber 13.

The pitch of the ridges 31 and 51 is not critical. However, for optimum performance and to adequately employ the surface tension of the lquid, the pitch, when employed with liquids such as water, should not exceed about .250 inch but may be made to any smaller pitch, as desired.

I claim as my invention:

1. A liquid evaporator structure formed of a thin corrugated sheet-like member extending downwardly and means utilizing surface tension characteristics of a liquid for spreading the liquid over said member in a thin film comprising downwardly extending ridges provided on said member having a predetermined height, each of said ridges having a centrally disposed downwardly extending liquid distributing groove and having a pair of convex surfaces extending in opposite directions away from said groove, said groove having a depth substantially less than the height of said ridges, whereby as liquid flows through said groove by gravitation, the surface tension of said liquid establishes a pressure gradient across said convex surfaces that drives the liquid in opposite directions from said groove and across said convex surfaces to form a thin liquid film.

2. The structure recited in claim 1 and further includings means for supplying liquid to the groove.

3. The structure recited in claim 1 in which said pair of surfaces are of convex curvilinear cross-sectional shape of increasing radius of curvature in opposite directions away from the groove.

4. A liquid evaporator structure formed of a thin, corrugated sheet-like member generally inclined with the horizontal, and means utilizing surface tension characteristics of a liquid and gravitational force on the liquid for spreading liquid over said member in a thin film, comprising a plurality of downwardly extending ridges provided on said member, said ridges each having a predetermined height being disposed in side-by-side relation, each of said ridges having a centrally disposed downwardly extending groove for distributing liquid to its associated ridge and having a pair of surfaces of convex curvilinear cross-sectional shape on opposite sides of said groove, said grooves having a depth substantially less than the height of said associated ridge, whereby as liquid flows through said grooves by gravitation, the surface tension of the liquid establishes a pressure gradient across said convex surfaces and the gravitational force on the liquid establishes a downward pressure gradient, said gradients being effective to drive the liquid in opposite directions from said grooves and downwardly across said convex surfaces to form a thin liquid film.

5. The structure recited in claim 4 and further including spray means for supplying liquid to each of the grooves.

6. The structure recited in claim 4 in which said convex surfaces are of increasing radius of curvature in opposite directions away from said groove and further including means for spraying liquid onto said grooves.

7. A liquid evaporator structure formed of a thin, corrugated sheet-like member inclined with the horizontal,
   means utilizing surface tension characteristics of a liquid for spreading the liquid on said member in a thin film comprising a plurality of downwardly extending ridges each having a predetermined height of elongated shape provided on said member, said ridges being disposed in side-by-side relation, each of said ridges having a pair of surface portions of convex curvilinear cross-sectional shape extending longitudinally thereof, a central downwardly extending groove disposed centrally in each of said ridges between said pair of surface portions for distributing liquid thereto, said groove having a depth substantially less than the height of said ridges, whereby as liquid flows through said grooves by gravitation, the surface tension of said liquid establishes a pressure gradient across said convex surfaces that drives the liquid in opposite directions from said grooves and across said convex surfaces to form a thin liquid film, and means for collecting excess liquid from said surface portions comprising a concave surface portion disposed between adjacent ridges and smoothly merging with said convex surfaces.

8. The structure recited in claim 7 and further including means for supplying liquid to each of said grooves.

9. A heat exchange structure formed of a thin, corrugated sheet-like member inclined with the horizontal and including an upper portion and a main portion, means for spreading liquid over said main portion in a thin film comprising a plurality of downwardly extending ridges in said main portion, each of said ridges having a predetermined height, said ridges being disposed in side-by-side relation, each of said ridges having a centrally disposed downwardly extending liquid distributing groove, said groove having a depth substantially less than the height of said ridges and having a pair of surface portions extending in opposite directions away from said groove, said pair of surface portions being formed in a manner to utilize the surface tension characteristics of the liquid to establish a pressure gradient effective to spread liquid in a thin film thereon, and means provided in said upper face portion and cooperatively associated with said main portion for accumulating and gravitationally directing liquid to said grooves.

10. The structure recited in claim 9 in which said last mentioned means comprises a plurality of concave surface portions disposed in side-by-side relation and each extending downwardly into registery with an associated groove, and a plurality of convex surface portions interposed between said concave portions and each extending downwardly and connecting a pair of adjacent ridges.

11. The structure recited in claim 10 in which said concave surface portions are convergent in downward directions and smoothly merge with the associated grooves, and said convex surface portions are complementary to said concave surface portions, are divergent in downward direction and smoothly merge with the associated ridges.

12. A liquid evaporator structure formed of
a pair of thin, corrugated sheet-like members generally inclined with the horizontal, each of said face portions having an upper portion,
a main portion disposed below said supper portion, and
a lower portion disposed below said main portion,
means for supplying liquid to said upper portion,
said upper portion having means for directing liquid to said main portion for evaporation, said main portion having a plurality of downwardly extending ridges of elongated shape, having a predetermined height and disposed in side-by-side relation, each of said ridges having a pair of longitudinally extending surface portions of convex cross-sectional shape formed to employ surface tension characteristics of the liquid and gravitational force on the liquid to spread the water in a thin film, a downwardly extending groove disposed in each of said ridges between said pair of surface portions for distributing liquid to said surface portions.

said groove having a depth substantially less than the height of said ridges, whereby as liquid flows through each said groove by gravitation, the surface tension of the liquid establishes a pressure gradient across said convex surfaces and the gravitational force on the liquid establishes a downward pressure gradient, said gradients being effective to drive the liquid in opposite directions from said grooves and downwardly across said convex surfaces to form a thin liquid film, and said lower portions being connected to each other and forming a trough for collecting excess liquid supplied to said main portions.

13. The structure recited in claim 12 in which
the liquid directing means includes a plurality of valleys disposed in axial registery and fluid flow communication with said grooves, and
the convex surface portions of each of said ridges are of increasing radius of curvature in opposite directions away from their associated grooves.

14. Apparatus for converting impure water into substantially pure water comprising
a shell structure,
heat exchanger plate structure formed of a thin, corrugated sheet-like member disposed within said shell structure and dividing said shell structure into an evaporation chamber and a condensing chamber,
means for delivering impure water to said evaporation chamber,
said heat exchanger structures having a downwardly extending evaporating face portion, and having a predetermined height
means utilizing surface tension characteristics of the water for establishing a pressure gradient to spread the water over said face portion in a thin film, comprising
a plurality of downwardly extending ridges of elongated shape provided on said face portion,
said ridges being disposed in side-by-side relation,
each of said ridges being of substantially semi-cylindrical cross-sectional shape and having a pair of convex surface portions extending longitudinally thereof, and
a downwardly extending groove diposed in each of said ridges between said pair of surface portions for distributing water thereto,
said groove having a depth substantially less than the height of said ridges,
spray means connected to said delivery means for supplying the impure water to said face portion for evaporation,
whereby as liquid flows through each said groove by gravitation, the surface tension of said liquid establishes a pressure gradient across the associated convex surfaces that drives the liquid in opposite directions from said groove and across said convex surfaces to form a thin liquid film, and
means including a conduit for translating vapor formed in said evaporating chamber to said condensing chamber for condensation by heat exchange with said plate structure, and
means for discharging the condensed vapor from said condensing chamber for useful purposes.

15. Apparatus for converting impure water into substantially pure water, comprising
  a shell structure,
  heat exchanger plate structure formed of a thin, corrugated sheet-like member disposed within said shell structure and dividing said shell structure into an evaporation chamber and a condensing chamber,
  means for delivering impure water to said evaporation chamber,
  said heat exchanger structure having a downwardly extending evaporating face portion and having a predetermined height,
  means utilizing surface tension characteristics of the water for establishing a pressure gradient to spread water over said face portion in a thin film, comprising
  a plurality of downwardly extending ridges of elongated shape provided on said face portion,
  said ridges being disposed in side-by-side relation,
  each of said ridges having a pair of surface portions of convex curvilinear cross-sectional shape extending longitudinally thereof, and
  a downwardly extending groove disposed in each of said ridges between said pair of surface portions for distributing water thereto,
  said groove having a depth substantially less than the height of said ridges,
  each of said surface portions being of increasing radius of curvature in opposite directions away from the associated groove,
  spray means connected to said delivery means for supplying the impure water to said face portion for evaporation,
  whereby as liquid flows through said groove by gravitation, the surface tension of said liquid establishes a pressure gradient across said convex surface portions that drives the liquid in opposite directions from said groove and across said convex surface portions to form a thin liquid film,
  means including a conduit for translating vapor formed in said evaporating chamber to said condensing chamber for condensation by heat exchange with said plate structure, and
  means for discharging the condensed vapor from said condensing chamber for useful purposes.

References Cited by the Examiner

UNITED STATES PATENTS

| | | |
|---|---|---|
| 1,359,276 | 11/1920 | Rushworth. |
| 2,445,471 | 7/1948 | Buckholdt _____ 165—83 |
| 2,642,897 | 6/1953 | Bell _____ 165—166 |
| 3,099,607 | 7/1963 | Lustenader et al. _____ 203—10 |
| 3,192,133 | 6/1965 | Ademac _____ 202—234 |

FOREIGN PATENTS

| | | |
|---|---|---|
| 205,057 | 3/1955 | Australia. |
| 326,964 | 11/1920 | Germany. |

NORMAN YUDKOFF, *Primary Examiner.*

WILBUR L. BASCOMB, JR., *Examiner.*

M. H. SILVERSTEIN, *Assistant Examiner.*